United States Patent [19]
Maarschalkerweerd

[11] Patent Number: 5,539,209
[45] Date of Patent: Jul. 23, 1996

[54] METHOD OF CLEANING FOULING MATERIALS FROM A RADIATION MODULE

[75] Inventor: Jan M. Maarschalkerweerd, Mount Brydges, Canada

[73] Assignee: Trojan Technologies Inc., London, Canada

[21] Appl. No.: 325,949

[22] Filed: Oct. 17, 1994

[51] Int. Cl.⁶ ........................................................ A61L 2/10
[52] U.S. Cl. ........................... 250/436; 250/435; 250/431; 250/432 R; 134/1; 422/24
[58] Field of Search .................................. 250/436, 431, 250/432 R, 435, 438; 134/1, 22.11, 184; 210/748; 422/22, 24

[56] References Cited

U.S. PATENT DOCUMENTS

| | | |
|---|---|---|
| 2,670,439 | 2/1954 | Darney. |
| 3,061,721 | 10/1962 | Brenner. |
| 3,182,191 | 5/1965 | McFarland et al.. |
| 3,456,107 | 7/1969 | Robertson. |
| 3,462,597 | 8/1969 | Young. |
| 4,103,167 | 7/1978 | Ellner ................. 250/432 R |
| 4,482,809 | 11/1984 | Maarschalkerweerd ................. 250/436 |
| 4,728,368 | 3/1988 | Pedziwiatr ................. 258/431 |
| 4,872,980 | 10/1989 | Maarschalkerweerd ................. 210/243 |
| 4,899,056 | 2/1990 | Ellner ................. 250/436 |
| 4,922,114 | 5/1990 | Boehme ................. 250/436 |
| 5,006,244 | 4/1991 | Maarschalkerweerd ................. 210/243 |
| 5,227,140 | 7/1993 | Hager et al. ................. 422/186.3 |
| 5,418,370 | 5/1995 | Maarschalkerweerd ................. 250/436 |

FOREIGN PATENT DOCUMENTS

| | | |
|---|---|---|
| 421296 | 1/1912 | France. |
| 434069 | 1/1921 | France. |
| 855521 | 7/1949 | Germany. |
| 2213658 | 3/1972 | Germany. |
| 3441535 | 11/1984 | Germany. |

OTHER PUBLICATIONS

"Die KATADYN UV–Verfahren zur Keimreduktior im Abwasser" Article, Jun. 1990, Katadyn Co., Germany, 10 pages.

*Primary Examiner*—Jack I. Berman
*Assistant Examiner*—Kiet T. Nguyen
*Attorney, Agent, or Firm*—Fitzpatrick, Cella, Harper & Scinto

[57] ABSTRACT

A method of cleaning fouling materials from a radiation module, the method comprising the steps of: (i) immersing at least a portion of the radiation module in a fluid; and (ii) subjecting the radiation module to vibration at a frequency sufficient to substantially inhibit fouling materials adhering to the at least one radiation source. A radiation module for use in a fluid treatment system comprising: a support member for mounting the module in the fluid treatment system; at least one radiation assembly extending from the support member; and a vibration generator associated with the at least one radiation assembly. The radiation module is self-cleaning and can take the form of a radiation source module or a radiation sensor module. Incorporation of the radiation source module in a fluid treatment system is also described.

47 Claims, 6 Drawing Sheets

5,539,209

METHOD OF CLEANING FOULING MATERIALS FROM A RADIATION MODULE

BACKGROUND OF THE INVENTION

1. Field of the Invention

In one of its aspects, the present invention relates to a method of cleaning fouling materials from a radiation module.

In another of its aspects, the present invention relates to a radiation module for use in a fluid treatment system, more particularly a self-cleaning radiation source module.

In yet another of its aspects, the present invention relates to a fluid treatment system, more particularly to a self-cleaning fluid treatment system.

In another of its aspects, the present invention relates to method of treating a fluid in a fluid treatment system comprising a radiation source module, more particularly to a method for treating a fluid in a manner which obviates formation of fouling materials on the radiation source module during treatment of the fluid.

2. Background of the Invention

Fluid treatment devices and systems are known. For example, U.S. Pat. Nos. 4,482,809, 4,872,980 and 5,006,244, and U.S. patent application Ser. No. 08/026,572, now U.S. Pat. No. 5,418,370 (all assigned to the assignee of the present invention), the contents of each of which are hereby incorporated by reference, all describe gravity fed fluid treatment systems which employ ultraviolet (UV) radiation to inactivate microorganisms present in the fluid.

The devices and systems described in the '809, '980 and '244 patents generally include several UV lamps each of which are mounted within sleeves extending between two support arms of the frames. The frames are immersed into the fluid to be treated which is then irradiated as required. The amount of radiation to which the fluid is exposed is determined by the proximity of the fluid to the lamps. One or more UV sensors may be employed to monitor the UV output of the lamps and the fluid level is typically controlled, to some extent, downstream of the treatment device by means of level gates or the like.

However, disadvantages exist with the above-described systems. Depending on the quality of the fluid which is being treated, the sleeves surrounding the UV lamps periodically become fouled with foreign materials, inhibiting their ability to transmit UV radiation to the fluid. When fouled, at intervals which may be determined from historical operating data or by the measurements from the UV sensors, the sleeves must be manually cleaned to remove the fouling materials. Regardless of whether the UV lamp frames are employed in an open, channel-like system or a closed system, cleaning of the sleeves is impractical.

In open, channel-like systems, the modules comprising the sleeves are usually removed from the channel and immersed in a separate tank containing a suitable cleaning fluid. In closed systems, the device must be shut down and the sleeves are thereafter cleaned by charging with a suitable cleaning fluid or by removal of the lamps and sleeves in the manner described for the open, channel-like systems. In either type of system, the operator must accept significant downtime of the system and/or invest significant additional capital to have in place sufficient redundant systems with appropriate control systems to divert the flow of fluid from the systems being cleaned.

The system described in the '370 patent is a significant advance in the art in that it obviates a number of disadvantages deriving from the '809, '980 and '244 patents. More specifically, in one of its embodiments, the system described in the '370 patent includes the provision of a cleaning apparatus for a radiation source assembly in the fluid treatment system. The cleaning apparatus comprises a cleaning sleeve engaging a portion of the exterior of the radiation source assembly and movable between a retracted position and an extended position. In the retracted position, a first portion of the radiation source assembly is exposed to a flow of fluid to be treated. In the extended position, the first portion of the radiation source assembly is covered by the cleaning sleeve. The cleaning sleeve includes a chamber in contact with the first portion of said radiation source assembly and is supplied with a cleaning solution suitable to remove undesired materials from the first portion of the radiation source assembly.

While the cleaning apparatus described in the '370 patent represents an advance in the art, it is relatively complicated and expensive to construct necessitating investment of more capital to build a fluid treatment plant. Further, in certain installations, the apparatus creates more hydraulic headloss in the flow of fluid being treated. Accordingly, it would be desirable to have a cleaning apparatus which is relatively simple and inexpensive to construct while maintaining the performance characteristics of the cleaning device described in the '370 patent.

SUMMARY OF THE INVENTION

It is an object of the present invention to provide a novel method of cleaning fouling materials from a radiation module.

It is another object of the present invention to provide a novel radiation module.

It is yet another object of the present invention to provide a novel fluid treatment device which obviates or mitigates at least one of the disadvantages of the prior art.

It is yet another object of the present invention to provide a novel method for treating a fluid which obviates or mitigates at least one of the disadvantages of the prior art.

Accordingly, in one of its aspects, the present invention provides a method of cleaning fouling materials from a radiation module, the method comprising the steps of:

(i) immersing at least a portion of the radiation module in a fluid; and (ii) subjecting the radiation module to vibration at a frequency sufficient to substantially inhibit fouling materials adhering to the radiation module.

In another of its aspects, the present invention provides a radiation module for use in a fluid treatment system comprising:

a support member for mounting the module in the fluid treatment system;

at least one radiation assembly extending from the support member; and vibration generation means associated with the at least one radiation assembly.

In yet another of its aspects, the present invention provides a fluid treatment system comprising a fluid inlet, a fluid outlet and a fluid treatment zone disposed between the fluid inlet and the fluid outlet, and at least one radiation module comprising a support member, at least one radiation assembly extending from the support member into the fluid treatment zone, and vibration generation means associated with the at least one radiation assembly.

In yet another of its aspects, the present invention provides a method of treating a fluid in a fluid treatment system comprising a fluid inlet, a fluid outlet a fluid treatment zone disposed between the fluid inlet and the fluid outlet, and at least one radiation module comprising a support member, at least one radiation assembly extending from the support member into the fluid treatment zone, and vibration generation means associated with the at least one radiation assembly, the method comprising the steps of:

(i) providing a flow of fluid to the fluid inlet;

(ii) feeding the flow of fluid from the fluid inlet to the fluid treatment zone;

(iii) exposing the flow of fluid to radiation in the fluid treatment zone;

(iv) operating the vibration generation means at a frequency sufficient to clean the at least one radiation assembly; and (v) feeding the flow of fluid to the fluid outlet.

Thus, in one of its aspects, the present invention relates to a radiation module for use in a fluid treatment system. As used throughout this specification, the term "radiation module" is intended to cover modules which emit or sense radiation. Thus, in a preferred embodiment, the present radiation module is a radiation source module which emits radiation in a fluid treatment system. In another embodiment, the present radiation module is a radiation sensor module which detects radiation being emitted from another source.

BRIEF DESCRIPTION OF THE DRAWINGS

Embodiments of the present invention will be described with reference to the accompanying drawings, in which.

In the Figures, like reference numerals from one Figure to another are intended to designated like parts.

DETAILED DESCRIPTION OF THE PREFERRED EMBODIMENTS

Figure 1:
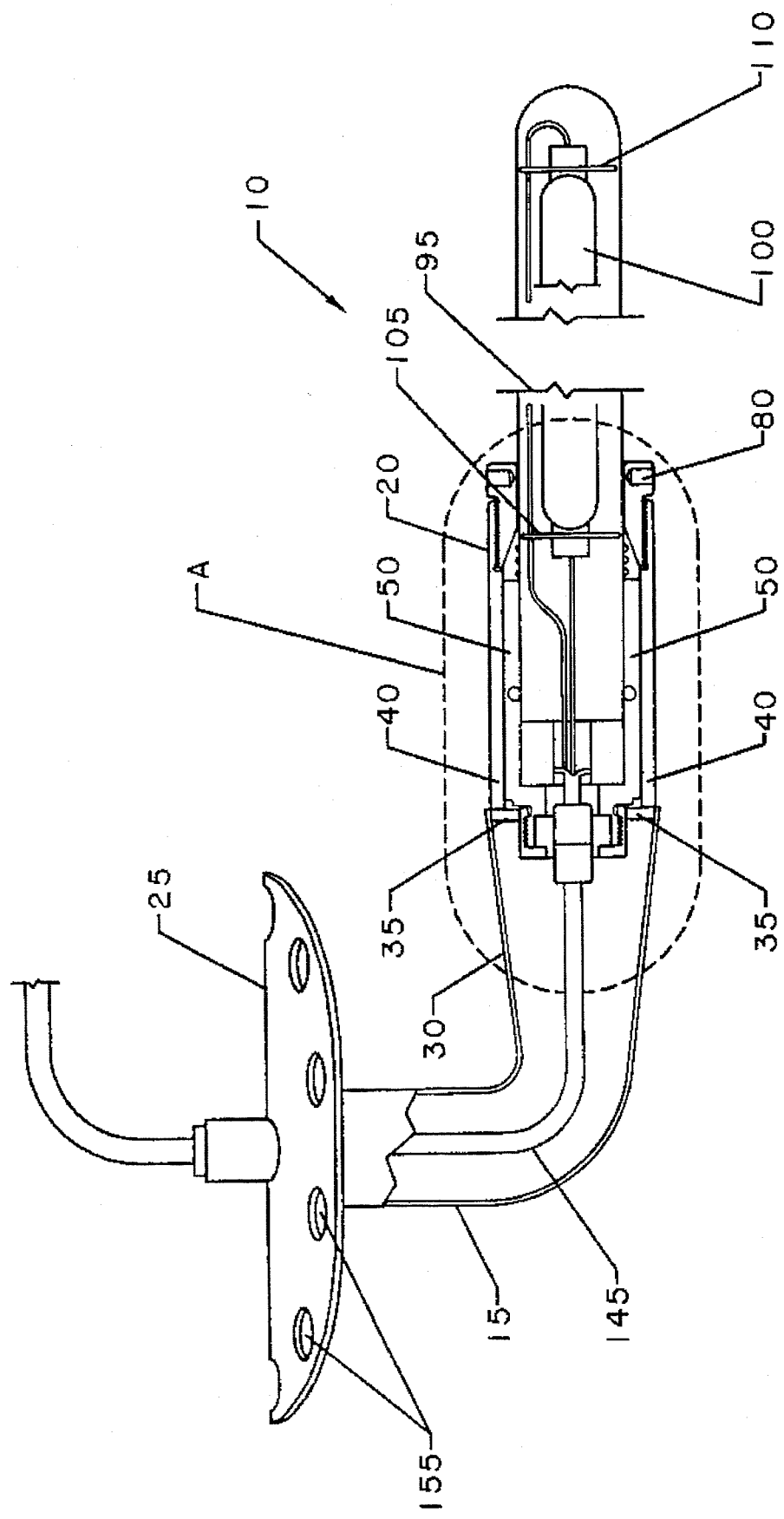
FIG. 1 illustrates an elevation, partially cut away of a first embodiment of a radiation source module in accordance with the present invention.
Figure 2:
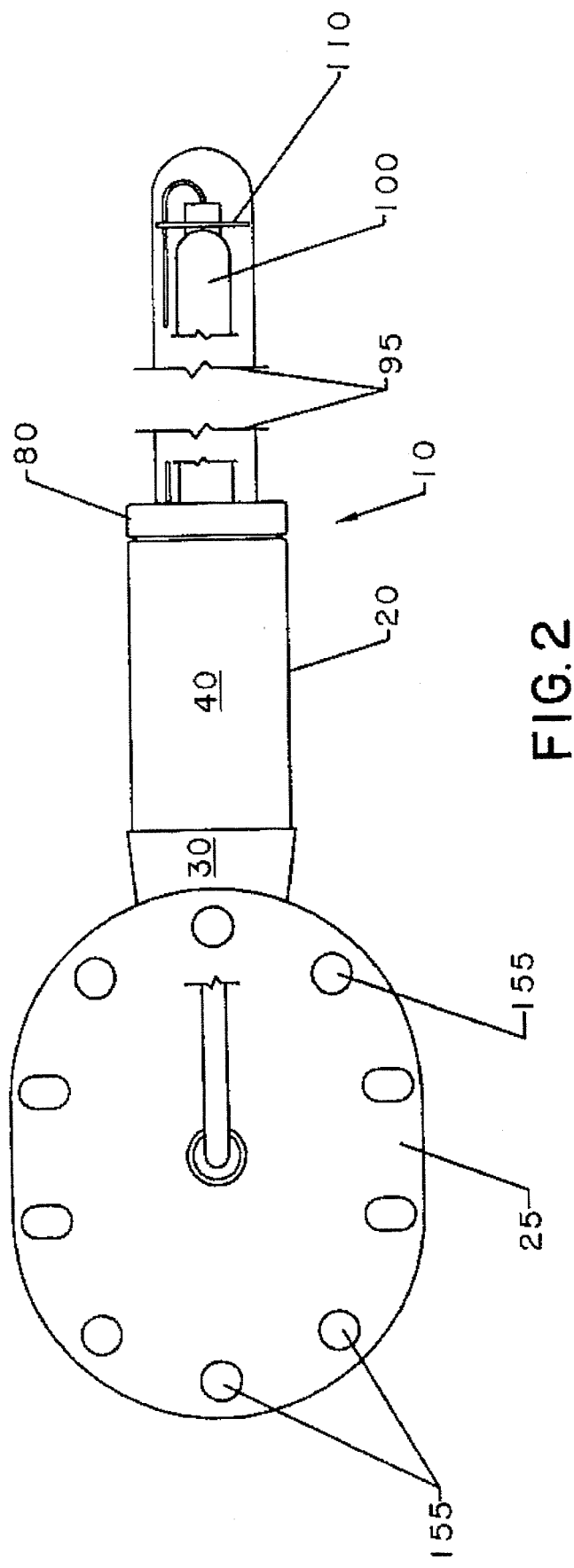
FIG. 2 illustrates a top view of the radiation source module illustrated in FIG. 1.
Figure 3:
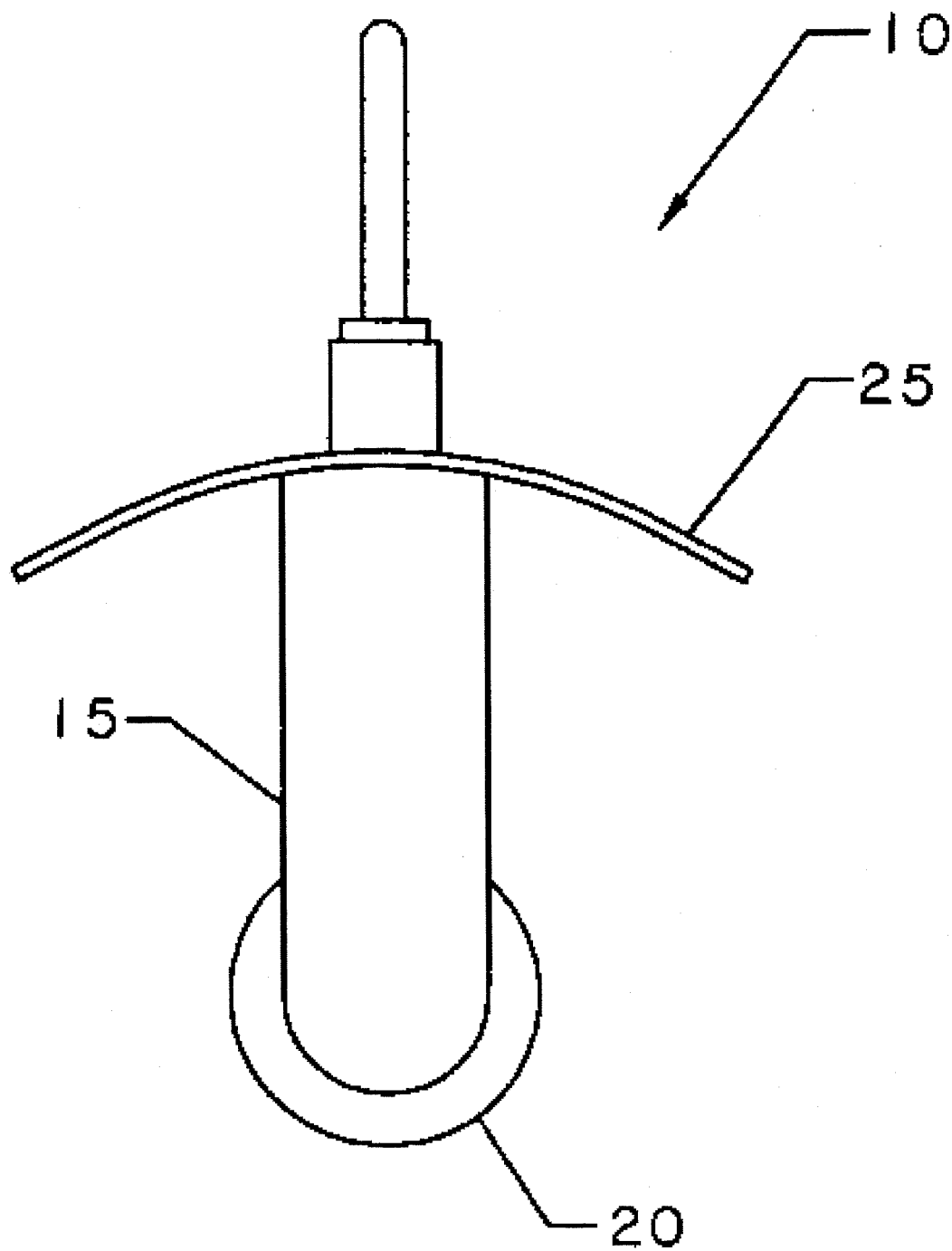
FIG. 3 illustrates an end view of the radiation source module illustrated in FIG. 1.
Figure 4:
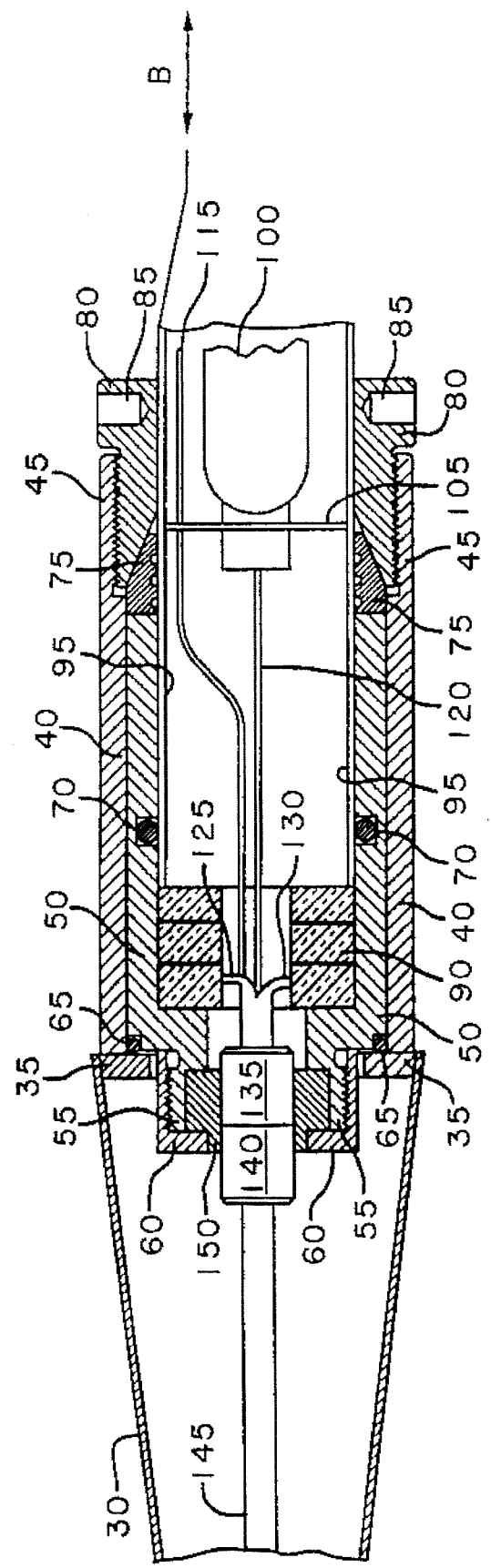
FIG. 4 illustrates an expanded view of the area indicated at A in FIG. 1.

Preferably, the present radiation module is a radiation source module which is essentially self-cleaning. As used throughout this specification, the terms "self-cleaning" and "cleaning" are intended to have a broad definition and encompass either or both of the removal of fouling materials from the radiation source assembly in the module and inhibition of fouling materials adhering to the radiation source assembly in the module. In most cases, the latter will be occurring if the vibration generation means is operated during the entire period of fluid treatment (i.e. continuous mode). However, it is clearly contemplated that the radiation source module can be operated in a manner wherein the vibration generation means is operated periodically during fluid treatment (i.e. semi-continuous mode). In this scenario, the fouling materials which became adhered to the radiation source assembly while the vibration generation means was not operated are quickly removed when the vibration generations means is activated.

The vibration generation means is associated with the radiation source assembly in the module and provides a minute, mechanical vibration of the radiation source assembly. Ideally, a surface of the vibration generation means abuts an end of the surface of the radiation source assembly which is exposed to (and thus likely to become fouled in) fluid and an opposed surface of the vibration generation means abuts a rigid surface of the radiation source module. This will serve to maximize translation of the vibration energy from the vibration generation means toward a free end of the radiation source assembly. The abutment can be direct or indirect. Preferably, a rigid insulating member, which is not a vibration generation means itself, is disposed between the vibration generation means and the rigid surface of the radiation source module and the radiation source assembly, respectively. This will provide an electrical insulation between the radiation source assembly and the rigid surface of the radiation source module. As will be apparent to those of skill in the art, vibration occurs in a reciprocal manner. Preferably, vibration is effected axially with respect to the radiation source assembly. Such vibration may be effected by utilizing a piezo-electric transducer, preferably a piezo-electric ceramic transducer. Piezo-electric ceramic transducers have been conventionally used in sonar applications. A suitable piezo-electric ceramic transducer useful in the present radiation source module is commercially available from EDO Corporation (Salt Lake City, Utah) and consists essentially of a ceramic component which meets the specifications of U.S. Navy Type 1 (I) or U.S. Navy Type 3 (III). As will be apparent to those of skill in the art, a ceramic meeting the specifications of U.S. Navy Type 1 is a hard lead zirconate titanate with a Curie point greater than about 310° C. and a ceramic meeting the specifications of U.S. Navy Type 3 is a very hard lead zirconate titanate with a Curie point greater than about 290° C. Detailed specifications of these ceramic specifications can be found in published Department of Defense Military Standard DOD-STD 1376A(SH), dated Feb. 28, 1984, the contents of which are hereby incorporated by reference.

Preferably, the radiation source assembly comprises, as the radiation source, an ultraviolet lamp. More preferably, the radiation source assembly further comprises a sleeve, most preferably a quartz sleeve, about the ultraviolet lamp which defines an insulating gap between the ultraviolet lamp and fluid being treated. A preferred sleeve has a closed end distal the support member and an open end sealably engaged to the support member. When this arrangement is used, it is preferred to use, as the vibration generation means, an annular piezo-electric transducer disposed between an abutment surface in the support member and the open end of the sleeve.

Generally, the vibration generation means, preferably a piezo-electric transducer, most preferably an annular piezo-electric transducer, is one which can be operated at a frequency in the range of from about 1 kHz to about 100 kHz, preferably from about 10 kHz to about 20 kHz, more preferably about 10 kHz to about 15 kHz. The frequency may be applied intermittently or continuously.

The present radiation source module is ideally suited to be used in a fluid treatment system comprising a fluid inlet, a fluid outlet and a fluid treatment zone disposed between the fluid inlet and the fluid outlet. The fluid treatment system can be an open system or a closed system.

As used throughout this specification, the term "closed system", in relation to treatment (i.e. irradiation) of a fluid, is intended to encompass a system characterized by a treatment zone (i.e. the zone in which the fluid is irradiated) in which the flow of fluid is pressurized and substantially completely contained in an enclosure throughout treatment. The source of pressurization of the flow of fluid is not particularly restricted. For example, the pressurizing can be generated by a pump and/or by the action of gravity. Examples of such a closed system can be found in incorporated U.S. patent application Ser. No. 08/026,572, now U.S. Pat. No. 5,418,370 (NB. this system is designated as a closed system by virtue of the treatment/irradiation zone), and application Ser. No. 08/323,808 of the present inventor, filed on even dated herewith and hereby incorporated by reference.

Further, as used throughout this specification, the term "open system", in relation to treatment (i.e. irradiation) of a fluid, is intended to encompass a system characterized by a treatment zone in which the flow of fluid is contained and treated (i.e. irradiated) in an open vessel (e.g. a channel) which is not completely filled by the fluid. Examples of such an open system can be found in incorporated U.S. Pat. Nos. 4,482,809, 4,872,980 and 5,006,244.

The present radiation source module is ideally used in a closed system for fluid treatment since such systems present the greatest challenge to clean and will minimize downtime and the need for redundant systems.

Figure 6:
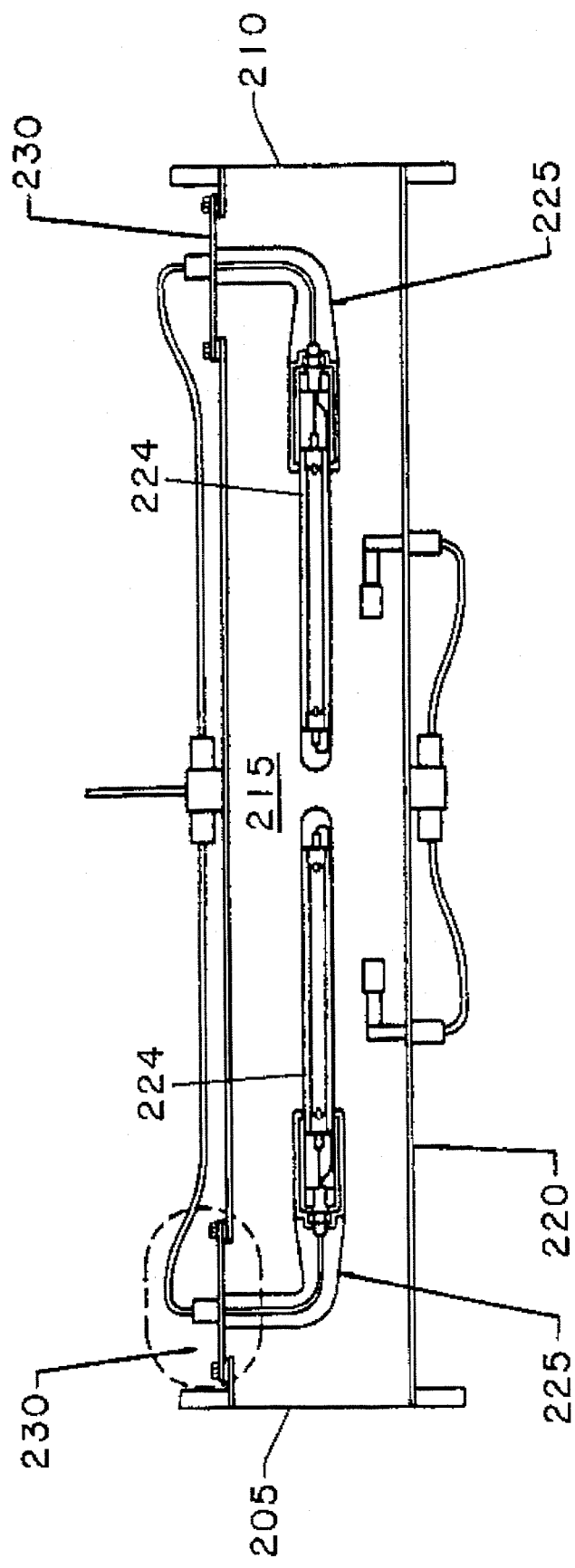
FIG. 6 illustrates an alternative fluid treatment system.

In one preferred embodiment, the closed fluid treatment system depicted in FIG. 6 has a fluid treatment zone 215 which comprises a housing 220 and at least one radiation source module 224 comprising a radiation source sealably connected to the support member 225, the support member sealably mounted to the housing. Preferably (but not necessarily), the radiation source is disposed substantially parallel to the flow of fluid. More preferably, the fluid inlet 205, the fluid outlet 210 and the fluid treatment zone 215 have substantially the same cross-section and are arranged in a substantially colinear manner. Ideally, the housing is a substantially elongate cylinder having a substantially circular cross-section. In this embodiment, the end of the support member 225 distal the radiation source may comprise a mounting plate 230 sealably connected to the housing. Preferably, the closed fluid treatment system comprises a plurality of radiation source modules 224 mounted circumferentially (not shown), more preferably equidistant from one another, about the housing to define a radiation source ring. If desirable the housing may comprise a plurality of such radiation source rings. The number of radiation source rings and the number of modules in each ring varies from installation to installation and may be selected by a person skilled in the art on the basis of a consideration of one or more of the following factors: the cross-sectional area of the housing, the volume of fluid passing through the housing, the radiation output from each module, the total amount of radiation required in the system and the like. This embodiment of the closed fluid treatment system may be used "in-line" in conventional fluid (e.g. water) piping. Depending on the particular application, the piping can be up to about 4 in. diameter for domestic applications, or 1 ft. to 3 ft. diameter or more for municipal applications.

Figure 5:
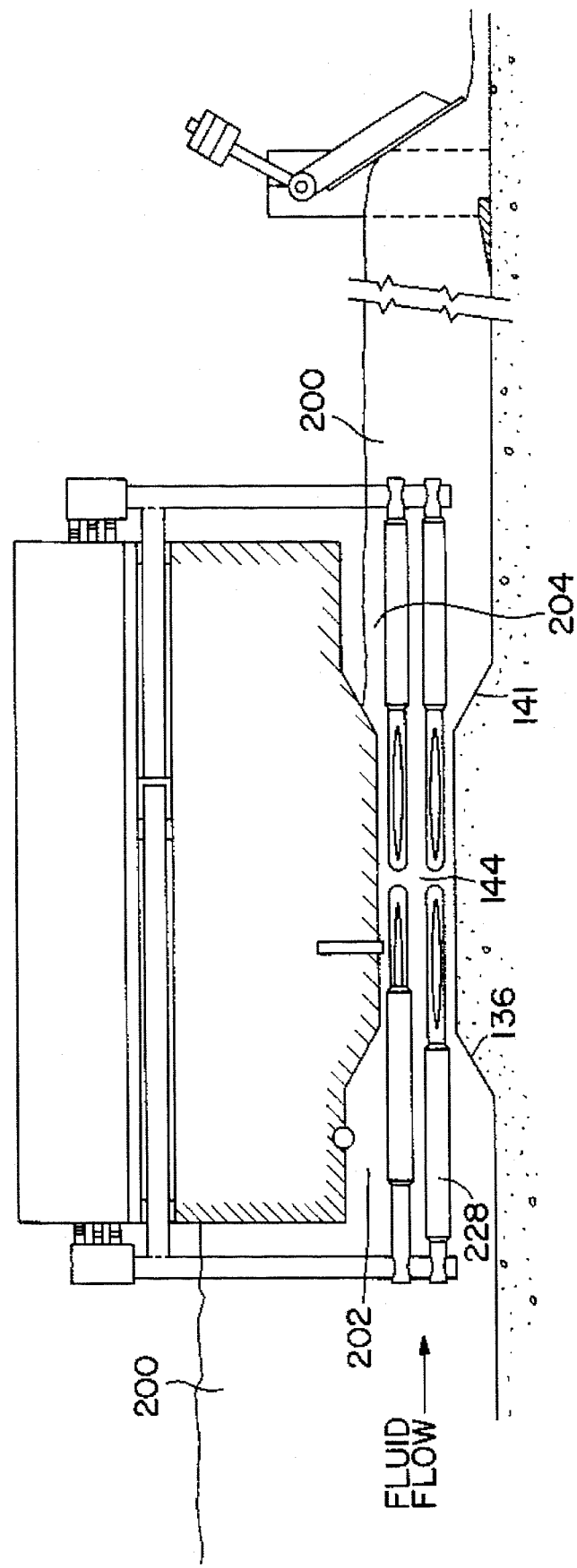
FIG. 5 illustrates a fluid treatment system.

In another preferred embodiment, shown in FIG. 5, the closed fluid treatment system is gravity fed and has a fluid treatment zone which comprises a closed cross-section to confine fluid 200 to be treated within a predefined maximum distance from the radiation source assembly. As used herein, the term "gravity fed" encompasses systems wherein the hydraulic head of the fluid is obtained from changes in the altitude of the fluid. It will be understood that such systems comprise both systems which are naturally gravity fed and systems wherein the altitude of the fluid is altered via pumps or other mechanical means to provide a gravity feed. Preferably, the radiation source assembly 228 is elongate and has a longitudinal axis substantially parallel to the direction of the fluid flow through the fluid treatment zone 144. The cross-sectional area of the fluid treatment zone is preferably less than that of the fluid inlet 202 and the fluid outlet 204. In most cases, this will result in a flow of fluid having a first velocity in the fluid inlet, a second velocity in the fluid treatment zone and a third velocity in the fluid outlet. Ideally, the second velocity (i.e. in the fluid treatment zone) is greater than at least one, and preferably both, of the first velocity and the third velocity. Preferably, the third velocity is substantially equal to the first velocity. More preferably, the cross-sectional area of the fluid treatment zone is less than the cross-sectional area of the fluid inlet and the fluid treatment zone is disposed in a treatment zone including a first transition region 136 connecting the fluid inlet to the fluid treatment zone, the transition region 136 reducing pressure loss in the fluid between the inlet and the fluid treatment zone, and serving to increase the velocity of the fluid. More preferably, the cross-sectional area of the fluid treatment zone is less than the cross-sectional area of the fluid outlet and the fluid treatment zone is disposed in a treatment zone including a second transition region 141 connecting the fluid outlet to the fluid treatment zone, the transition region 141 reducing pressure loss in the fluid between the outlet and the fluid treatment zone, and serving to decrease the velocity of the fluid. Most preferably, the fluid treatment zone includes first and second transition regions.

With reference to FIGS. 1–4, there is illustrated a radiation source module 10 comprising a support member 15, a radiation source assembly 20 extending from support member 15 and a mounting plate 25 for affixing radiation source module 10 in the fluid treatment system.

Radiation source assembly 20 includes a concentric reducer 30 which can be welded to or made integral with support member 15. Affixed to concentric reducer 30 is a ring 35 to which is affixed a mounting sleeve 40. The end of mounting sleeve 40 distal concentric reducer 30 has a threaded portion 45. Disposed within mounting sleeve 40 is an inner sleeve 50 having a threaded portion 55 to which is engaged a cap nut 60. Inner sleeve 50 comprises suitable notches to receive a pair of resilient O-rings 65,70. The end of inner sleeve 50 distal concentric reducer 30 abuts a resilient, tapered sealing ring 75. A threaded mounting nut 80 engages threaded portion 55 of mounting sleeve 40 and abuts tapered sealing ring 75. Threaded mounting nut 80 is provided with torquing receptacles 85 which receive a suitable tool useful for torquing mounting nut 80 into sealing engagement with mounting sleeve 40.

Disposed within inner sleeve 50 is an annular piezo-electric ceramic transducer 90 which is a laminate structure made up of a plurality of individual annular piezo-electric ceramic transducers adhered together. One end of transducer 90 abuts inner sleeve 50 and the other end of transducer 90 abuts the open end of a quartz sleeve 95. As illustrated, the opposite end of quartz sleeve 95 is closed. It will be appreciated by those of skill in the art that a double open-ended quartz sleeve could be used. Disposed within quartz sleeve 95 is a radiation source 100. Ideally, the radiation source is an ultraviolet lamp. The ultraviolet lamp is not particulary restricted and the choice thereof is within the purview of a person skill in the art. A pair of spacers 105,110 are disposed within quartz sleeve 95 and serve to center and hold in place radiation source 100 within quartz sleeve 95.

A pair of electrical leads 115,120 emanate from radiation source 100 and are fed to a first connector 135. Another pair of electrical leads 125,130 emanate from transducer 90 and are also fed to first connector 135. First connector 135 is connected to a second connector 140. Emanating from second connector 140 is an electrical conduit 145 which is fed through concentric reducer 30, support member 15 and mounting plate 25. Electrical conduit 145 is connected to a suitable power supply and control system (not shown) which are conventional in the art.

Partially surrounding each first connector 135 and second connector 150 is an insulating ring 150. Insulating ring 150 is made of an electrically non-conductive material and serves to minimize or eliminate the occurrence of arcing across the electrical connection made by engagement of first connector 135 and second connector 140. Preferably, insulating ring 150 is non-resilient and made from hard rubber or plastic (e.g. Delrin™).

In the illustrated embodiment, mounting plate 25 is curved and comprises a plurality of apertures 155. This embodiment of radiation source module 10 may be used advantageously in a pressurized, closed system such as the one described in incorporated copending U.S. patent application Ser. No. 08/212,808, filed on even date herewith in the name of the present inventor. In this embodiment, radiation source assembly 20 is inserted in a housing through an aperture of smaller size than but similar shape to mounting plate 25. Bolts emerge from the housing in a pattern similar to the pattern of apertures on mounting plate 25. A radiation source module is then affixed in place by torquing nuts on each bolt in a manner which provides a hermetic seal by means of an O-ring (or other sealing ring, not shown) between mounting plate 25 and the housing.

Radiation source module may be constructed in the following manner. Initially, insulating ring 150 is placed in the end of inner sleeve 50 and held in place by engagement of cap nut 60 to threaded portion 55 of inner sleeve 50. First connector 135 is partially inserted into insulating ring 150 and transducer 90 is placed in abutment with inner sleeve 50. O-ring 70 is placed in the notch in inner sleeve 50 and quartz sleeve 95 (containing radiation source 100) is inserted in inner sleeve 50 such that it abuts transducer 90. O-ring 65 and tapered sealing ring 75 are positioned in place with respect to inner sleeve 50 which is then inserted in mounting sleeve 40. Prior to complete insertion into mounting sleeve 40, first connector 135 and second connector 140 are engaged. Mounting nut 80 is then threaded into engagement with threaded portion 45 of mounting sleeve 40. Using an appropriate tool (not shown) mounting nut 80 is torqued with a force to achieve two objectives. First, force should be sufficient to compress O-rings 65,70 and tapered sealing ring 75 to provided a hermetic seal between the fluid exterior radiation source assembly 20 and the electrical leads 115, 120,125,130 interior the radiation source assembly 20. Second, the force should be sufficient to ensure an abutting connection between quartz sleeve 95 and transducer 90, and transducer 90 and inner sleeve 50, respectively.

In use, radiation source module 10 is placed in a fluid (such as water) to be treated such that radiation source 100 is substantially completely immersed. Electrical conduit 145 is connected to a suitable power supply which serves to drive radiation source 100 and transducer 90. During operation, the flow of fluid is irradiated by radiation source 100. Concurrently, transducer 90 vibrates quartz sleeve 95 in a reciprocating manner as depicted by arrow B in FIG. 4. This reciprocating motion serves to remove fouling materials (e.g. minerals, bacteria, etc.) which may be adhered to the quartz sleeve. Further, the reciprocating motion serves to prevent adherence of fluid borne fouling materials to quartz sleeve. As will be apparent to those of skill in the art, the reciprocating action serves to subject a fouling material on quartz sleeve 95 to a significant shearing force which either removes adhered fouling material from or inhibits formation of fouling material on quartz sleeve 95.

Of course it will be appreciated by those of skill in the art that the illustrated embodiments of the radiation source module may be varied to suit the particular fluid treatment system without departing from the spirit of the invention. For example, mounting plate 25 can be omitted and support member 15 can be extended to form a leg which has a length equal to or greater than the length of radiation source assembly 20. This type of radiation source module would be useful in a fluid treatment system such as the one described in incorporated U.S. patent application Ser. No. 08/026,572, now U.S. Pat. No. 5,418,370, and the ones described in the '809, '980 and '244 patents incorporated hereinabove. Further, the number, type and arrangement of sealing tings (i.e. O-rings, tapered rings, etc. ) can be varied while maintaining a hermetic seal. Still further, while the present radiation source module is advantageously used to concurrently irradiate fluid and keep the radiation source assembly free of fouling materials in sire, it is possible to remove the radiation source module from the fluid treatment device, place in a fluid (e.g. a cleaning fluid in an external container), and activate the vibration generation means only (i.e. no irradiation of fluid)—this variation relates to a protocol for cleaning the radiation source assembly of the module without concurrently treating or purifying the fluid.

While the foregoing description teaches a radiation source module, as discussed hereinabove, an embodiment of the invention relates to a radiation sensor module. Such a module may be constructed by substituting radiation source 100 and electrical leads 115,120,125,130 with a photodiode (or the like) capable of sensing the intensity of the a radiation being emitted at a particular wavelength of interest. The choice of photodiode (or the like) is not particularly restricted and can be a material conventionally used in current radiation sensors. Further, the electrical connection and control of the photodiode is conventional and would be apparent to a person skilled in the art.

Thus, it should be readily apparent that, while exemplary embodiments of the present invention have been described herein, the present invention is not limited to these exemplary embodiments and that variations and other alternatives may occur to those of skill in the art without departing from the intended spirit and scope of the invention as defined by the attached claims.

What is claimed is:

1. A radiation module for use in a fluid treatment system comprising:

a support member for mounting the module in the fluid treatment system;

at least one radiation assembly extending from the support member; and vibration generation means in direct contact with the at least one radiation assembly.

2. The radiation module defined in claim 1, wherein the radiation assembly comprises a radiation source assembly.

3. The radiation module defined in claim 2, wherein the vibration generation means is disposed between the support member and the radiation assembly.

4. The radiation module defined in claim 2, wherein the radiation assembly comprises an ultraviolet lamp.

5. The radiation module defined in claim 4, wherein the radiation assembly further comprises a sleeve about the ultraviolet lamp which defines an insulating gap between the ultraviolet lamp and fluid being treated.

6. The radiation source module defined in claim 5, wherein the sleeve has a closed end distal the support member and an open end sealably engaged to the support member.

7. The radiation source module defined in claim 2, wherein the support member comprises at least two ultraviolet lamps connected thereto.

8. The radiation source module defined in claim 2, wherein the vibration generation means is capable of operating at a frequency in the range of from about 1 kHz to about 100 kHz.

9. The radiation source module defined in claim 2, wherein the vibration generation means is capable of operating at a frequency in the range of from about 10 kHz to about 15 kHz.

10. The radiation source module defined in claim 2, wherein the support member includes conduit means through which an electrical power supply is provided to the radiation source assembly and the vibration generation means.

11. The radiation module defined in claim 1, wherein the radiation assembly is a radiation sensor assembly.

12. A radiation module for use in a fluid treatment system comprising:
   a support member for mounting the module in the fluid treatment system;
   at least one radiation source assembly extending from the support member; and
   vibration generation means associated with the at least one radiation source assembly, the vibration generation means comprising at least one annular piezoelectric transducer disposed between an abutment surface in the support member and an open end of a sleeve.

13. A radiation module for use in a fluid treatment system comprising:
   a support member for mounting the module in the fluid treatment system;
   at least one radiation source assembly extending from the support member; and
   vibration generation means associated with the at least one radiation source assembly, the vibration generating means comprising a plurality of annular piezoelectric transducers adhered to one another and disposed between an abutment surface in the support member and an open end of a sleeve.

14. A method of cleaning fouling materials from a radiation module having vibration generator, the method comprising the steps of:
   (i) immersing at least a portion of the radiation module in a fluid; and
   (ii) directly contacting the vibration generator to the radiation module to subject the radiation module to vibration at a frequency sufficient to substantially inhibit fouling materials adhering to the radiation module.

15. The method defined in claim 14, wherein the frequency is in the range of from about 1 kHz to about 100 kHz.

16. The method defined in claim 14, wherein the frequency is in the range of from about 10 kHz to about 20 kHz.

17. The method defined in claim 14, wherein the frequency is in the range of from about 10 kHz to about 15 kHz.

18. The method defined in claim 14, wherein the frequency is applied intermittently.

19. The method defined in claim 14, wherein the frequency is applied continuously.

20. The method defined in claim 14, comprising the further step of exposing the fluid to radiation.

21. The method defined in claim 20, wherein the radiation is ultraviolet radiation.

22. A fluid treatment system comprising a fluid inlet, a fluid outlet and a fluid treatment zone disposed between the fluid inlet and the fluid outlet, and at least one radiation source module comprising a support member, at least one radiation source assembly extending from the support member into the fluid treatment zone, and vibration generation means in direct contact with with the at least one radiation source assembly.

23. The fluid treatment system defined in claim 22, wherein the vibration generation means is disposed between the support member and the at least one radiation source assembly.

24. The fluid treatment system defined in claim 22, wherein the at least one radiation source assembly comprises an ultraviolet lamp.

25. The fluid treatment system defined in claim 24, wherein the radiation source assembly further comprises a sleeve about the ultraviolet lamp which defines an insulating gap between the ultraviolet lamp and fluid being treated.

26. The fluid treatment system defined in claim 25, wherein the sleeve has a closed end distal the support member and an open end sealably engaged to the support member.

27. The fluid treatment system defined in claim 22, wherein the vibration generation means is capable of operating at a frequency in the range of from about 1 kHz to about 100 kHz.

28. The fluid treatment system defined in claim 22, wherein the support member includes conduit means through which an electrical power supply is provided to the radiation source assembly and the vibration generation means.

29. The fluid treatment system defined in claim 22, wherein the fluid treatment zone comprises a housing and the at least one radiation source module comprises a radiation source sealably connected to the support member, the support member sealably mounted to the housing.

30. The fluid treatment system defined in claim 29, wherein the radiation source is disposed substantially parallel to the flow of fluid.

31. The fluid treatment system defined in claim 30, wherein the fluid inlet, the fluid outlet and the fluid treatment zone have substantially the same cross-section.

32. The fluid treatment system defined in claim 31, wherein the fluid inlet, the fluid, the fluid outlet and the fluid treatment zone are arranged in a substantially colinear manner.

33. The fluid treatment system defined in claim 22, wherein the system is gravity fed and the fluid treatment zone is closed cross-section to confine fluid to be treated within a predefined maximum distance from the at least one radiation source assembly.

34. The fluid treatment system defined in claim 33, wherein the at least one radiation source assembly is elongate and has a longitudinal axis substantially parallel to the direction of the fluid flow through the fluid treatment zone.

35. The fluid treatment system defined in claim 33, wherein the cross-sectional area of the fluid treatment zone is less than the cross-sectional areas of the fluid inlet and the fluid outlet, the fluid treatment zone being disposed in a treatment zone including first and second transition regions, the first transition region connecting the fluid inlet to the fluid treatment zone and the second transition region connecting the fluid treatment zone to the fluid outlet, the first and second transition regions reducing pressure loss in the fluid between the fluid inlet and the fluid treatment zone and between the fluid treatment zone and the fluid outlet, respectively.

36. A fluid treatment system comprising:

a fluid inlet;

a fluid outlet;

a fluid treatment zone disposed between the fluid inlet and the fluid outlet;

at least one radiation source module comprising a support member and having a sleeve;

at least one radiation source assembly extending from the support member into the fluid treatment zone, the radiation source assembly comprising an ultraviolet lamp disposed in the sleeve; and vibration generation means associated with the at least one radiation source assembly, the vibration generation means comprising at least one annular piezoelectric transducer disposed between an abutment surface in the support member and an open end of the sleeve.

37. A fluid treatment system comprising:

a fluid inlet;

a fluid outlet;

a fluid treatment zone disposed between the fluid inlet and the fluid outlet;

at least one radiation source module comprising a support member and having a sleeve;

at least one radiation source assembly extending from the support member into the fluid treatment zone, the radiation source assembly comprising an ultraviolet lamp disposed in the sleeve; and vibration generating means associated with the at least one radiation source assembly, the vibration generation means comprising a plurality of annular piezoelectric transducers adhered to one another and disposed between an abutment surface in the support member and an open end of the sleeve.

38. A method of treating a fluid in a fluid treatment system comprising a fluid inlet, a fluid outlet and a fluid treatment zone disposed between the fluid inlet and the fluid outlet, and at least one radiation source module comprising a support member, at least one radiation source assembly extending from the support member into the fluid treatment zone, and vibration generation means associated with the at least one radiation source assembly, the method comprising the steps of:

(i) providing a flow of fluid to the fluid inlet;

(ii) feeding the flow of fluid from the fluid inlet to the fluid treatment zone;

(iii) exposing the flow of fluid to radiation in the fluid treatment zone;

(iv) directly contacting the vibration generation means to the at least one radiation source assembly and operating the vibration generation means at a frequency sufficient to clean the at least one radiation source assembly; and (v) feeding the flow of fluid to the fluid outlet.

39. The method defined in claim 38, wherein the vibration generation means is operated at a frequency in the range of from about 1 kHz to about 100 kHz.

40. The method defined in claim 38, comprising the further step of feeding the flow of fluid in a direction substantially parallel to the at least one radiation source.

41. The method defined in claim 40, wherein the flow of fluid through the fluid inlet, the fluid outlet and the fluid treatment zone is substantially colinear.

42. The method defined in claim 41, comprising the further step of selecting the fluid inlet, the fluid outlet and the fluid treatment zone having substantially the same cross-section.

43. The method defined in claim 38, wherein the radiation source module comprises at least one ultraviolet lamp.

44. The method defined in claim 43, wherein the at least one radiation source assembly further comprises a sleeve about a portion of the exterior of the at least one ultraviolet lamp.

45. The method defined in claim 38, wherein the flow of fluid is at a first velocity in the fluid inlet, a second velocity in the treatment zone and a third velocity in the fluid outlet, the second velocity being greater than both of the first velocity and the third velocity.

46. The method defined in claim 45, wherein prior to step (ii), the fluid flow is admitted to a transition zone which increases the velocity thereof.

47. The method defined in claim 45, wherein prior to step (v), the fluid flow is admitted to a transition zone which decreases the velocity thereof.

* * * * *